(12) United States Patent
Ruff et al.

(10) Patent No.: US 9,678,209 B2
(45) Date of Patent: Jun. 13, 2017

(54) SYSTEM FOR LASER DETECTION WITH ENHANCED FIELD OF VIEW

(71) Applicant: U.S. Army Research Laboratory ATTN: RDRL-LOC-I, Adelphi, MD (US)

(72) Inventors: William C Ruff, Catonsville, MD (US); Barry Lee Stann, Edgewater, MD (US); Mark M Giza, Kensington, MD (US); William B. Lawler, Annapolis, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1088 days.

(21) Appl. No.: 13/848,312

(22) Filed: Mar. 21, 2013

(65) Prior Publication Data
US 2015/0177383 A1    Jun. 25, 2015

Related U.S. Application Data

(60) Provisional application No. 61/700,631, filed on Sep. 13, 2012.

(51) Int. Cl.
*G01C 3/08*    (2006.01)
*G01S 17/89*    (2006.01)
(Continued)

(52) U.S. Cl.
CPC ............ *G01S 17/89* (2013.01); *G01S 7/4816* (2013.01); *G01S 7/4861* (2013.01); *G01S 17/42* (2013.01); *G02B 6/06* (2013.01); *G02B 26/0833* (2013.01)

(58) Field of Classification Search
CPC ...... G02S 17/89; G01S 7/4816; G01S 7/4861; G01S 17/42; G02B 6/06; G02B 26/0833
See application file for complete search history.

(56) References Cited

U.S. PATENT DOCUMENTS 5,162,754 A  * 11/1992  Soares .................... H03F 1/483
                                            250/214 A
8,081,301 B2    12/2011  Stann
(Continued)

OTHER PUBLICATIONS

Giza, M., et al, "MEMS- Scanned Ladar Sensor for Small Ground Robots : Brassboard Design and Experimental Results" , MSS Active Systems Conference , Proc. SPIE 7684, Laser Radar Technology and Applications XV, 76841E (Apr. 29, 2010); doi:10.1117/12.850388.

(Continued)

*Primary Examiner* — Luke Ratcliffe
*Assistant Examiner* — Samantha K Abraham
(74) *Attorney, Agent, or Firm* — Lawrence E. Anderson (57) ABSTRACT

A system comprising a laser for transmitting a beam of light towards a target area; a controller for controlling the output of the laser; a receiver for collecting reflected pulses of light reflected from the target area, the receiver comprising a plurality of receive elements, each of the receive elements having a different field of view; a combiner for combining the outputs of the receive elements into one composite signal of the target area; an interface circuitry for converting the composite signal into an image; display unit displaying output from interface circuitry.

20 Claims, 9 Drawing Sheets

(51) Int. Cl.
*G01S 17/42* (2006.01)
*G01S 7/481* (2006.01)
*G01S 7/486* (2006.01)
G02B 26/08 (2006.01)
G02B 6/06 (2006.01)

(56) References Cited

U.S. PATENT DOCUMENTS

| | | |
|---|---|---|
| 8,242,428 B2 | 8/2012 | Meyers |
| 2002/0193067 A1* | 12/2002 | Cowley ................ H03H 11/362 455/3.02 |
| 2003/0043058 A1* | 3/2003 | Jamieson .............. G01S 17/933 340/961 |
| 2008/0212974 A1* | 9/2008 | Davies ............... H04B 10/2575 398/140 |
| 2009/0002794 A1* | 1/2009 | Weir .................. A61B 1/00096 359/213.1 |
| 2013/0070239 A1* | 3/2013 | Crawford ................ G01S 17/66 356/139.04 |
| 2013/0101176 A1* | 4/2013 | Park ........................ G01S 17/36 382/106 |

OTHER PUBLICATIONS

Stann, B. L. et. Al., "Brassboard development of a MEMS-scanned ladar sensor for small ground robots," Proc. SPIE Laser Radar Technology and Applications XVI, (2011).

Stann, B. L. et. al., "A low-cost compact ladar for ground robots," Proc. SPIE Laser Radar Technology and Applications XIV, vol. 7323, (2009).

\* cited by examiner

Figure 1: Total system FOV may be divided into, for example, 30 smaller FOV 101 segments, each covered by a separate receive element.

Figure 2: Receive elements collect scattered light within their FOV from the laser illuminator

FIG. 6
MAARS ladar signal flow

Figure 7 Modular Advanced Armed Robotic System (MAARS) ground robot

FIG. 8 Rapid Deceleration or quick stop

SYSTEM FOR LASER DETECTION WITH ENHANCED FIELD OF VIEW

CROSS REFERENCE TO RELATED APPLICATIONS

This application is a nonprovisional application of U.S. Provisional Application No. 61/700,631 to which priority is being claimed.

STATEMENT OF GOVERNMENT INTEREST

The invention described herein may be manufactured, used, and licensed by or for the United States Government.

BACKGROUND OF THE INVENTION

A LADAR transmitting and receiving system and method is disclosed in U.S. Pat. No. 8,081,301 (hereinafter '301 patent), hereby incorporated by reference. The '301 patent discloses a compact LADAR transmitting and receiving apparatus including a pulse laser generating pulses of light; a transmitter collimating and directing the pulses of light toward a target; a receiver collecting reflected pulses of light, the reflected pulses of light having been reflected from the target, the receiver comprising a tapered fiber bundle; a sensor operatively connected to the tapered fiber bundle, where the sensor comprises a photosensitive region and outputs a photocurrent; an amplifier amplifying the photocurrent; and a power divider splitting the amplified photocurrent between a high gain channel and a low gain channel; a RF interface accepting the high gain channel, the low gain channel, and an undelayed sample of a pulse of light generated from the pulse laser as input; a processing unit accepting output from the RF interface; and a display unit displaying output from the processing unit. The display unit formats the received data to form a three dimensional imager representing the position and range to objects in the surrounding area. This 3-D display is presented to the user in either a false color or stereoscopic format to represent the position and range information and updated periodically each time the ladar completes a scan. This micro-electromechanical system (MEMS) based Wide-FOV ladar uses a non-imaging optic based receiver designed to achieve the wide FOV. For certain applications requiring increased performance, such as imaging targets at a longer range, a receiver with higher optical gain would be desirable. However, since the field of view of the system disclosed in the '301 patent is very large, receivers using a classical optics design do not achieve the desired optical gain.

The embodiment described in the '301 patent was developed to meet specific size, weight, power and cost constraints for a small robot application. Other applications, such as helicopter aided landing, have similar size, weight, power and cost constraints but require much higher ranging performance to measure targets at further distances. The increased range requirement can be met by increasing the laser power; which are technically viable but a significant power increase is not feasible if the design is to stay within the size, weight, power and cost constraints.

BRIEF SUMMARY OF THE INVENTION

The light energy from each pulse is collected by the individual receive elements and combined by either electrically adding the signals or electrically switching the signals to form a composite receive pulse sampled by the ladar system. Since the light energy is paramount, optical distortion and aberrations do not severely affect the system performance. Also, by combining the individual receive elements together to form the composite field of view is performed electrically and does not require sophisticated algorithms or additional compute elements. Any imperfections, such as amplitude variations at the seams, can be characterized and normalized when the data is displayed to the user with no adverse effects. Due to these facts, this embodiment is distinguishable from applications that combine high fidelity imagery from separate focal plane array sensors or other imaging devices to form a larger composite image.

A preferred embodiment of the invention disclosed herein uses a receive element composed of optical components, either classical imaging or non-imaging optics, a small number of detectors, and amplification, summing, and/or switching electronic circuits. Each receive element is composed of a detector or group of detectors coupled to an individual optical component, either a classical lens or non-imaging optics, to achieve its desired field of view. Multiple receive elements are then mechanically mounted in a way to point each at a specific angle so their combined field of view achieves the required total system field of view.

The ladar receiver performance is directly related to the effective aperture of the input optical system. Larger effective aperture increases the amount of light energy collected and increases the effective range of the system. However, the field of view of the optical system is inversely proportional to the effective aperture, practically limiting the size of the effective aperture for a given field of view. This embodiment solves this dilemma by dividing the overall field of view into smaller pieces, with each smaller piece covered by a separate receive element which can have a larger effective aperture due to its smaller field of view. Thus, when properly combined, the small field of view receivers increase the overall system performance over that which can be achieved with a single wide field of view receiver.

A preferred embodiment uses the enhanced capabilities described above for a Rotorcraft Advanced Surveillance and Collision Avoidance Ladar (RASCAL) application. Imaging laser radar (ladar) provide a 3-D image of the landing zone along with object size and distance from the aircraft information as a pilot aid for a rotary aircraft landing in these difficult situations. An ARL study demonstrated the preferred embodiment of the ladar is capable of satisfying the requirements for a landing zone imaging ladar. The ladar embodiment, originally designed for a PackBot, is very small and can easily be re-packaged into an existing rotorcraft internal compartment. No external pod mount is necessary, but may be optionally used.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof; and the embodiments of the invention include all such modifications.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second field of views, these terms are only used to distinguish one field of view, element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations are to be expected. Thus, embodiments of the present invention should not be construed as limited to the particular shapes of regions illustrated herein but are to include deviations in shapes that result, for example, from manufacturing. Regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

Figure 1:
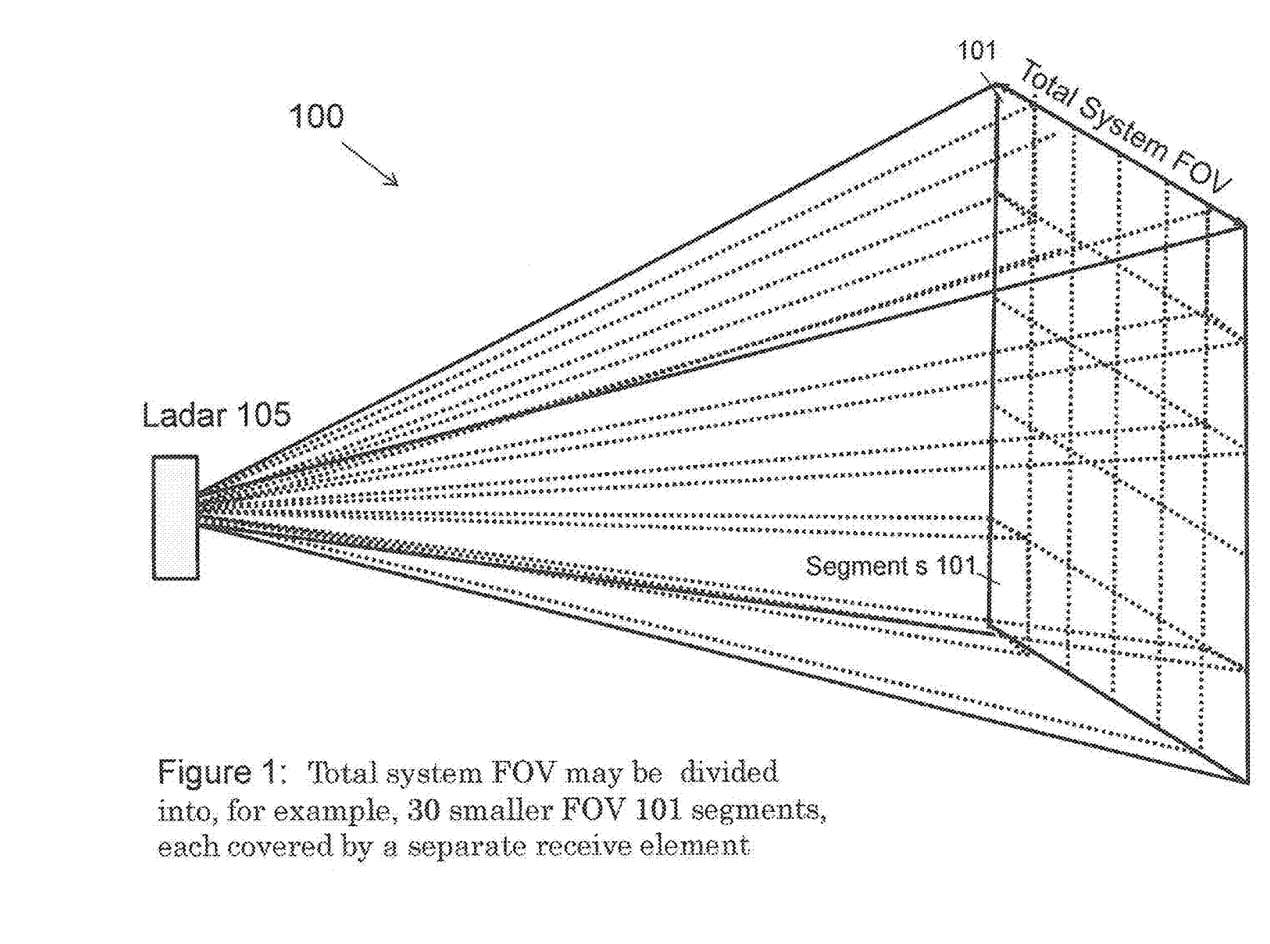
FIG. 1 is a diagrammatic illustration of the total system field of view (FOV) divided into, for example, 30 small FOV segments, each segment covered by a separate receive element.

FIG. 1 is a schematic block diagram of a preferred embodiment implementation of the new approach. The total system field of view is divided into smaller field of view segments 101 as illustrated. For example, the segments 101 may number 30, but the invention is in no way limited to a specific number of segments. When constructed, each receive element field of view is slightly larger than the size of a segment as illustrated and, due to the geometry of the mounting system, is pointed to overlap slightly with adjacent receive elements to provide continuous coverage within the total system field of view.

Figure 2:
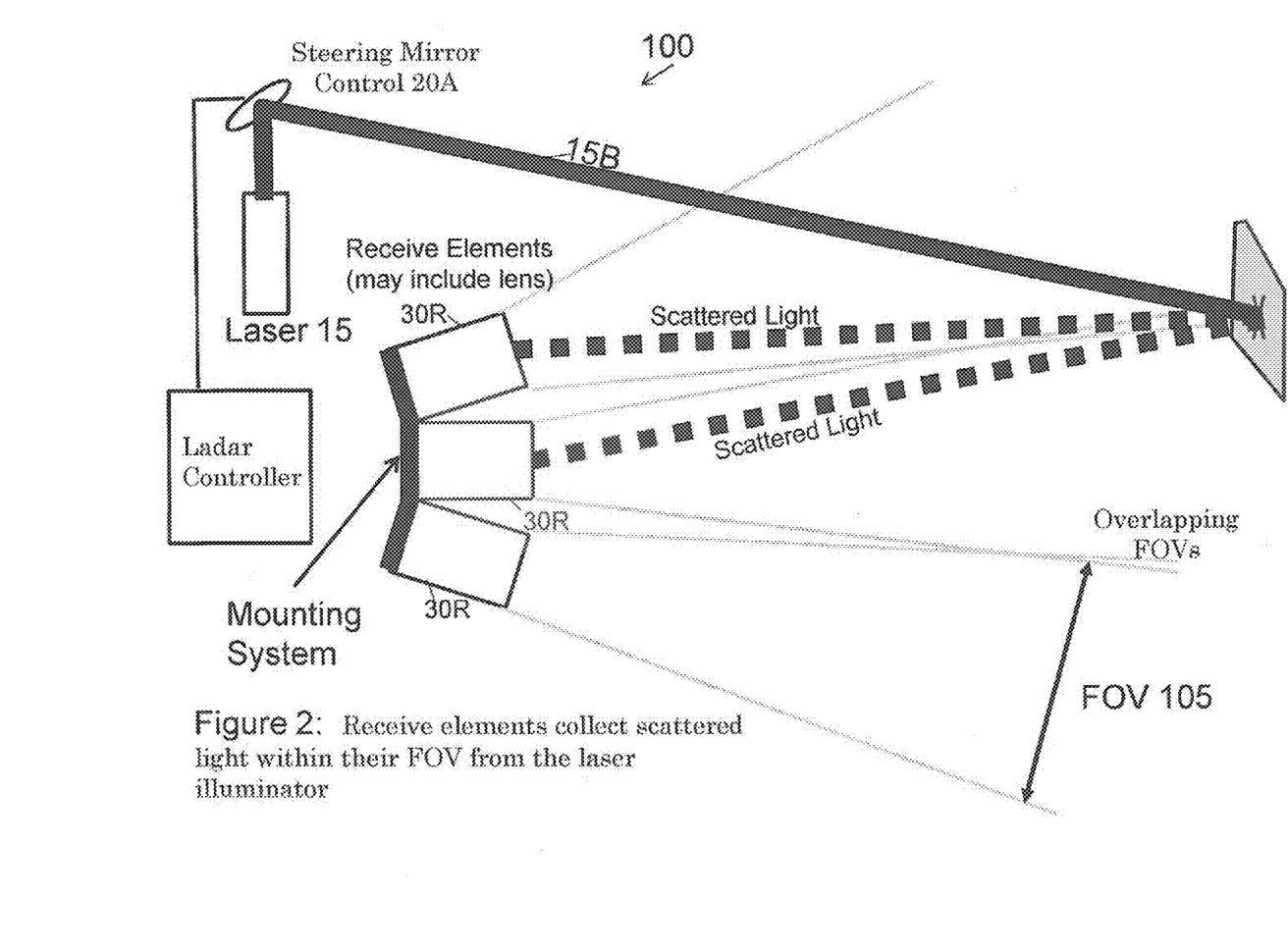
FIG. 2 is an illustration depicting the operation of the preferred embodiment where the receive elements 30R collect scattered light within their FOV from the laser illuminator.

FIG. 2 illustrates a preferred embodiment ladar system 100 operation constructed using the principles of the present invention. A small beam 15B of collimated light from the laser transmitter 15 is directed onto a electrically controlled mirror 20A and directed to travel within the total system field of view until it impacts a target as indicated by the x in the figure. Light is scattered from the target and collected by the receive element(s) when the spot is within the elements FOV 105. The collected light is then converted to an electrical signal and electrically combined into a composite signal in one of two subassemblies as illustrated in FIGS. 3A and 3B.

Figure 3A:
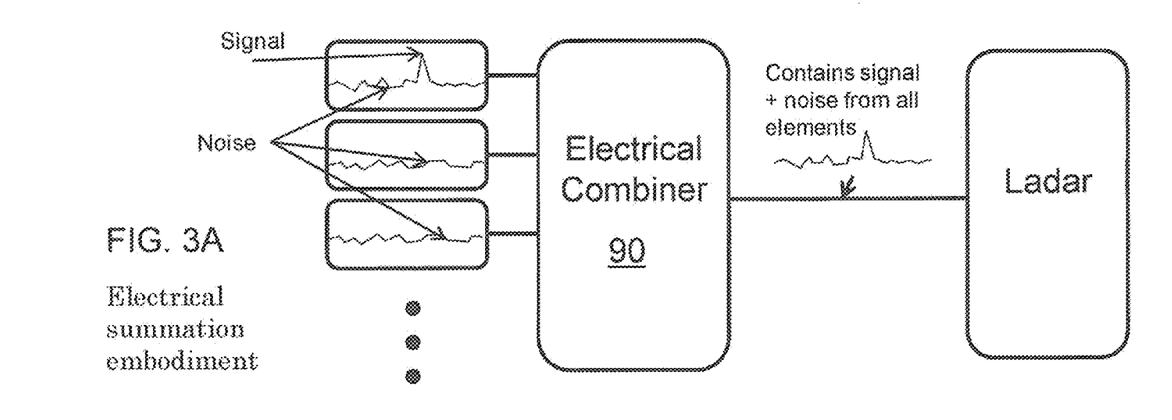
FIG. 3A is a schematic illustration of an electrical sampling embodiment having an electrical summation combiner.
Figure 3B:
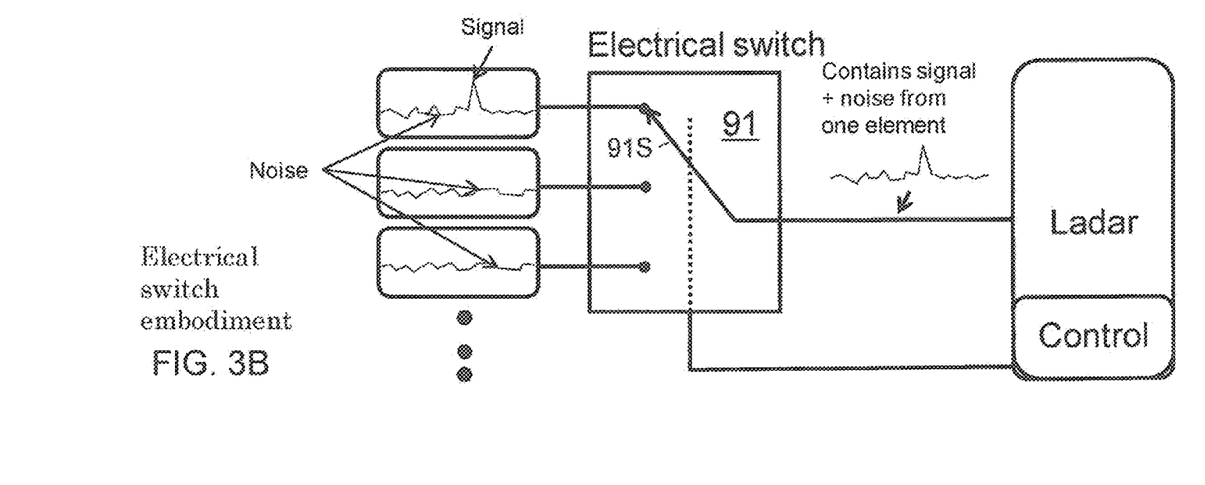
FIG. 3B is a schematic illustration of an electrical sampling embodiment having an electrical switch combiner

As shown diagrammatically in the FIG. 3A, the electrical signal from each receive element is combined by electrical addition to produce a composite signal composed of the target signal from the illuminated receive element(s) plus the noise from all of the receive elements. In the second subassembly shown diagrammatically in FIG. 3B, the receive element containing the light signal is electrically switched by the ladar controller to the input of the ladar for sampling as represented in FIG. 3B by the arrow 91S. The correct receive element is chosen by the ladar controller because the ladar controller also directs the light beam via the transmitter scan mirror In the second embodiment, the ladar samples an electrical signal which contains the signal and only the noise from one receive element which increases the overall system performance.

A preferred embodiment ladar is a low-cost, compact, and low-power ladar imager for rotor aircraft navigation, obstacle/collision avoidance, and target detection and identification and other high performance applications.

Desirable performance goals for a ladar imager include a 5-Hz image update rate, a 32,768 pixel image size, a 45°×30° field of regard, an 80-m range, a 40-cm range resolution, and eye-safe operation. In addition, the design must also fit the general size, power, and cost constraints expected with a rotorcraft application. These specifications were derived to illustrate a generic rotorcraft landing zone imaging ladar and do not fit a specific landing zone imaging ladar application nor constrain the disclosure in any way.

Figure 4:
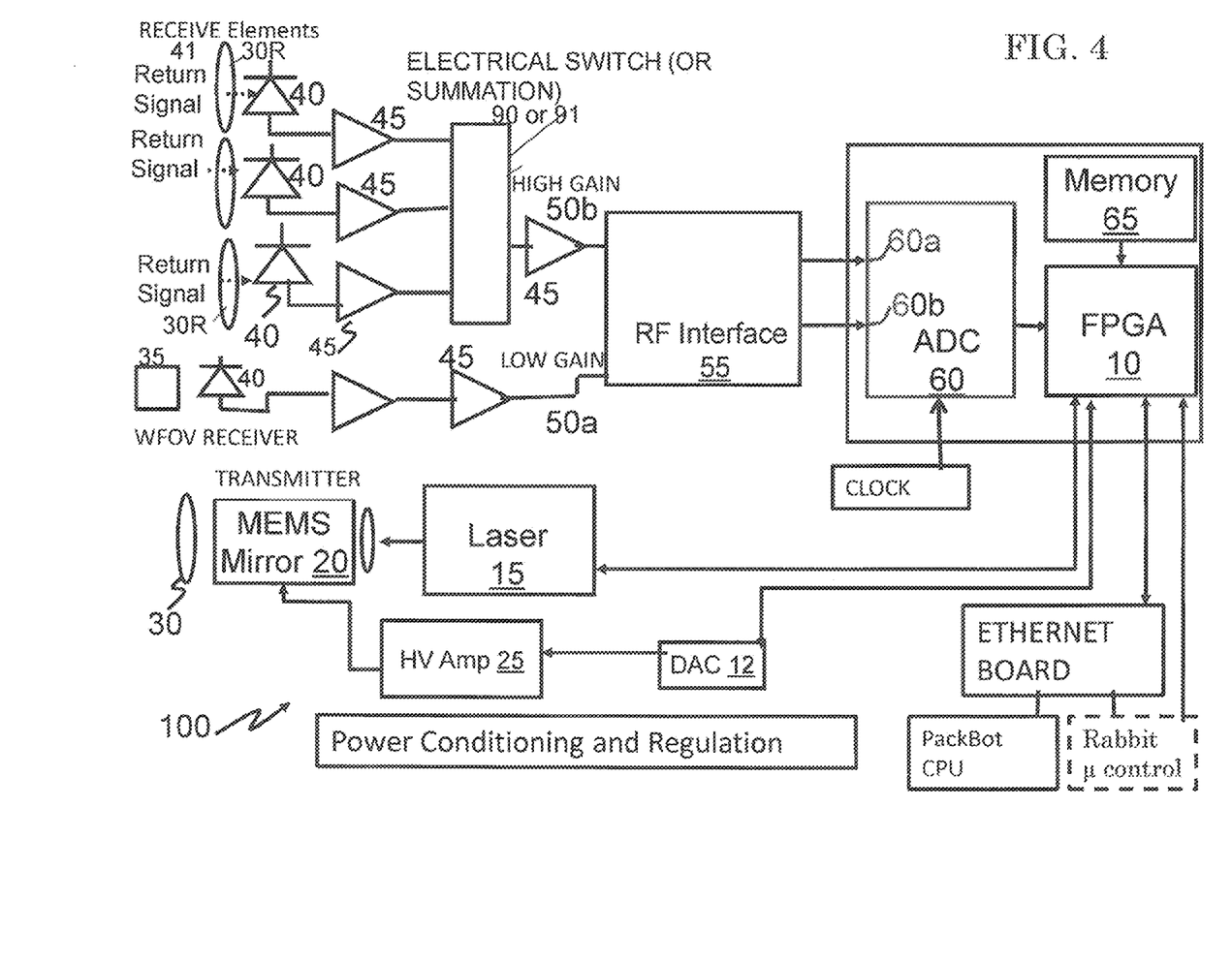
FIG. 4 is a schematic illustration of a preferred embodiment Ladar system block diagram.

Illustrated in FIG. 4 is a schematic diagram of LADAR transceiver 100 according to an embodiment herein. In FIG. 4, a trigger signal from field-programmable gate array (FPGA) 10 commands laser 15 (e.g., an Erbium fiber laser) to emit a short pulses of light (e.g., 2-3 ns pulses, at 200 kHz). These pulses of light are collimated and then directed to the surface of mirror 20 (e.g., may be embodied as a small microelectromechanical system (MEMS) mirror. In addition, analog voltages from high voltage amplifier (HV Amp) 25 control the pointing direction of mirror 20. As the pulses of light are reflected from mirror 20, they are subsequently fed into telescope 30 to amplify the reflected angle.

Light backscattered upon hitting a target is collected by one of two receivers. In U.S. Pat. No. 8,081,301, one receiver is disclosed with a fiber bundle 35, which may or may not be tapered (tapering fiber bundle 35 effectively increases the diameter of photo detector 40 and thereby increases the signal-to-noise ratio). Photocurrent from photo detector 40 is fed into amplifier 45, which may be embodied as a monolithic 50 ohm microwave amplifier.

Light backscattered upon hitting a target is also collected by a second receiver. This receiver is disclosed as combination of receive elements mechanical mounted to in a way in which their combined field of view achieve the required system wide field of view. Each receive element may use either an imaging or non-imaging optical element 41 to gather the scattered light signal. As depicted in FIG. 4, photocurrent from each photo detector 40 is fed into amplifiers 45, which may be, for example, a monolithic 50 ohm microwave amplifier. In a preferred embodiment, the output of each amplifier 45 is fed into a microwave combiner 90 (see FIG. 3A) to produce a summation signal that includes the amplified laser produced photocurrent signal plus the noise derived from all of the detector elements. In an alternate preferred embodiment, the output of each amplifier 45 is fed into a microwave switch 91 (see FIG. 3B). The box shown in FIG. 4 labeled 90, 91 is representative of each of the subassemblies illustrated in FIGS. 3A and 3B. The switch 91 is controlled by FPGA 10 which connects the detector element "looking" at the laser return signal at the time of the measurement to the switch output. The output of the microwave switch 91, therefore, includes the amplified laser produced photocurrent signal plus the noise derived from only one of the detector elements. The output of the microwave combiner 90 or microwave switch 91 may be optionally fed into amplifier 45 which may be embodied as a monolithic 50 ohm microwave amplifier.

The output of amplifier 45 may be optionally fed into the low gain channel 50a. The output of amplifier 45 may be optionally fed into the high gain channel 50b. In radio frequency (RF) interface board 55, both low gain channel 50a and high gain channel 50b may be adjusted in amplitude and limited in amplitude to produce output channels 55a and 55b. In addition, inputs to RF interface board 55 may be summed with a photocurrent from an undelayed sample of the original transmitted light signal, shown as T-zero 55c (not shown). T-zero 55c pulse of the transmitted signal is optionally used as a reference to determine target range. Output channels 55a and 55b are subsequently feed into analog-to-digital converter (ADC) 60, shown in FIG. 4 as a two channel 8-bit ADC, via input channels 60a and 60b. ADC 60 optionally samples input channels 60a and 60b which may be done at a 1.5 giga-samples-per-second (GSPS) rate. This sampling data may be fed to a field-programmable gate array (FPGA) 10, which stores the sampling data as a function of time from ADC 60 in memory 65. FPGA 10 also determines the range to the pixel, and formats the data for acquisition by computer for display. Memory is also used to hold a digitized version of mirror scan positions used to point the mirror to each position in an image. The scan memory is optionally a first-in first-out register (FIFO) physically located in the FPGA or contained in memory 65. For each scan position, FPGA 10 reads the scan position from the memory and sends the data to MEMS mirror 20 (e.g., via digital-to-analog converter (DAC) 12)

and then directs the laser 15 to emit a pulse. Although a MEMS mirror has been illustrated, the invention is not limited to a MEMS mirror.

To increase the receiver capture area for a given size of photo detector 40, a fiber bundle 35 (described in the '301 patent) may be used to magnify the apparent size of a photo detector (e.g., a 1 mm diameter photo detector can theoretically increase its effective diameter to 3.1 mm at the front of a tapered fiber bundle, when the tapered fiber bundle 35 has a magnification ratio equal to 3.1:1). The photo detectors 40 may comprise a series of PIN InGaAs photo detectors. The capacitance of photo detector 40 may limit the output bandwidth of amplifier 45 (e.g., a photo detector with a 1 mm diameter detecting surface may limit bandwidth to about 85 MHz when fed directly into a 50 ohm microwave amplifier). This issue is addressed via L-C circuit 75 between photo detector 40 and amplifier 45 input to extend the bandwidth with a tolerable level of pulse distortion and stretching.

The receive elements can use both imaging and non-imaging optics to generate their individual field of view (e.g. FOV 105). As described in the '301 patent, a non-imaging optic can be used to increase the apparent detector size or effective aperture without suffering detrimental bandwidth limitations. For the receive elements, a larger gain optical taper can be used due to the reduced FOV of the individual element over a receiver looking at the entire system FOV. A classical lens 41 may also be used to magnify the apparent size of the photo detector or combination of detectors and cover the receiver element FOV. Multiple receive elements are then mechanically mounted in a way to point each at a specific angle so their combined field of view achieves the required total system field of view as discussed previously and illustrated in FIG. 2. The photo detectors 40 may comprise a series of PIN InGaAs photo detectors. The capacitance of photo detector 40 may limit the output bandwidth of amplifier 45 (e.g., a photo detector with a 1 mm diameter detecting surface may limit bandwidth to about 85 MHz when fed directly into a 50 ohm microwave amplifier). This issue is addressed via L-C circuit 75 between photo detector 40 and amplifier 45 input to extend the bandwidth with a tolerable level of pulse distortion and stretching.

Figure 5A:
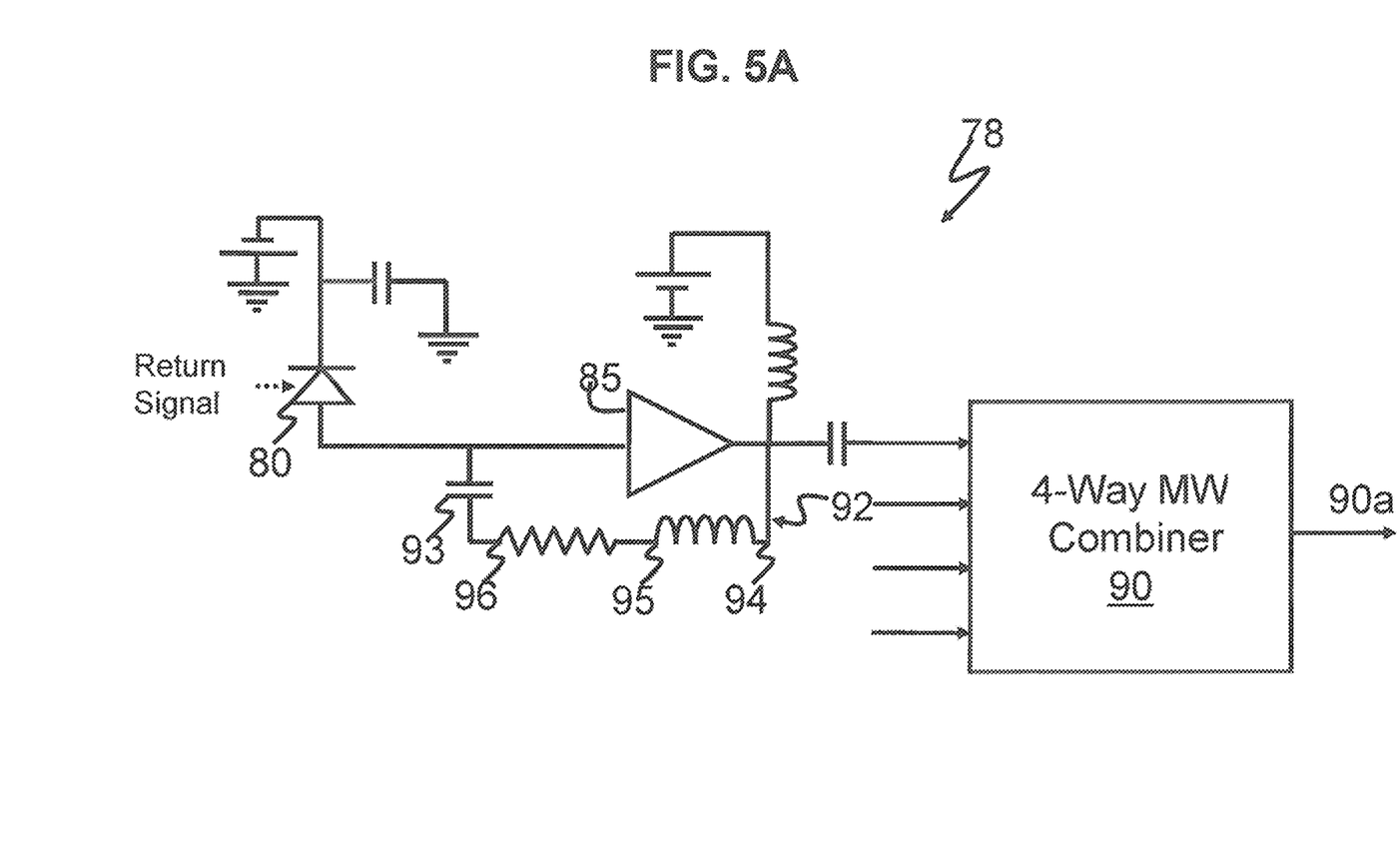
FIG. 5A is a schematic illustration of a single PIN chip detector wherein the output of each PIN chip detector 80 is fed into a separate microwave amplifier 85; the output of each microwave amplifier 85 is fed into an n-way microwave combiner 90, which yields target signal 90a that has an improved signal-to-noise ratio compared to the individual output of any of microwave amplifier 85.

As shown in FIG. 4, photocurrent from photo detectors 40 may be amplified by using one or more amplifiers 45. Each amplifier 45 in FIG. 4 may be, for example, a surface mounted monolithic microwave amplifier, which are typically low-cost. Furthermore, each amplifier 45 may have a bandwidth ranging from 1 to 7 GHz and yield power gains to 20 db with noise figures around 2.4 db. Although amplifiers 45 shown in FIG. 4 may be a surface mounted monolithic microwave amplifier, embodiments described herein are not to such a configuration, and those skilled in the art could readily devise a different configuration without undue experimentation. Thus, FIG. 4 uses a low power and low noise figure model (as provided by amplifiers 45) for the first stage of photocurrent amplification. FIG. 5A, however, uses a plurality of chip detectors 80 instead of a single photo detector 40. For example, since each PIN chip detector 80 may be only 1 mm square, four PIN chip detectors 80 may be coupled to the output of fiber bundle 35 or coupled to classical lens elements 41. FIG. 5A illustrates a single PIN chip detector 80. The output of each PIN chip detector 80 is fed into a separate microwave amplifier 85. The output of each microwave amplifier 85 is fed into an n-way microwave combiner 90. Microwave combiner 90 yields target signal 90*a* that has an improved signal-to-noise ratio compared to the individual output of any of microwave amplifier 85.

Figure 5B:
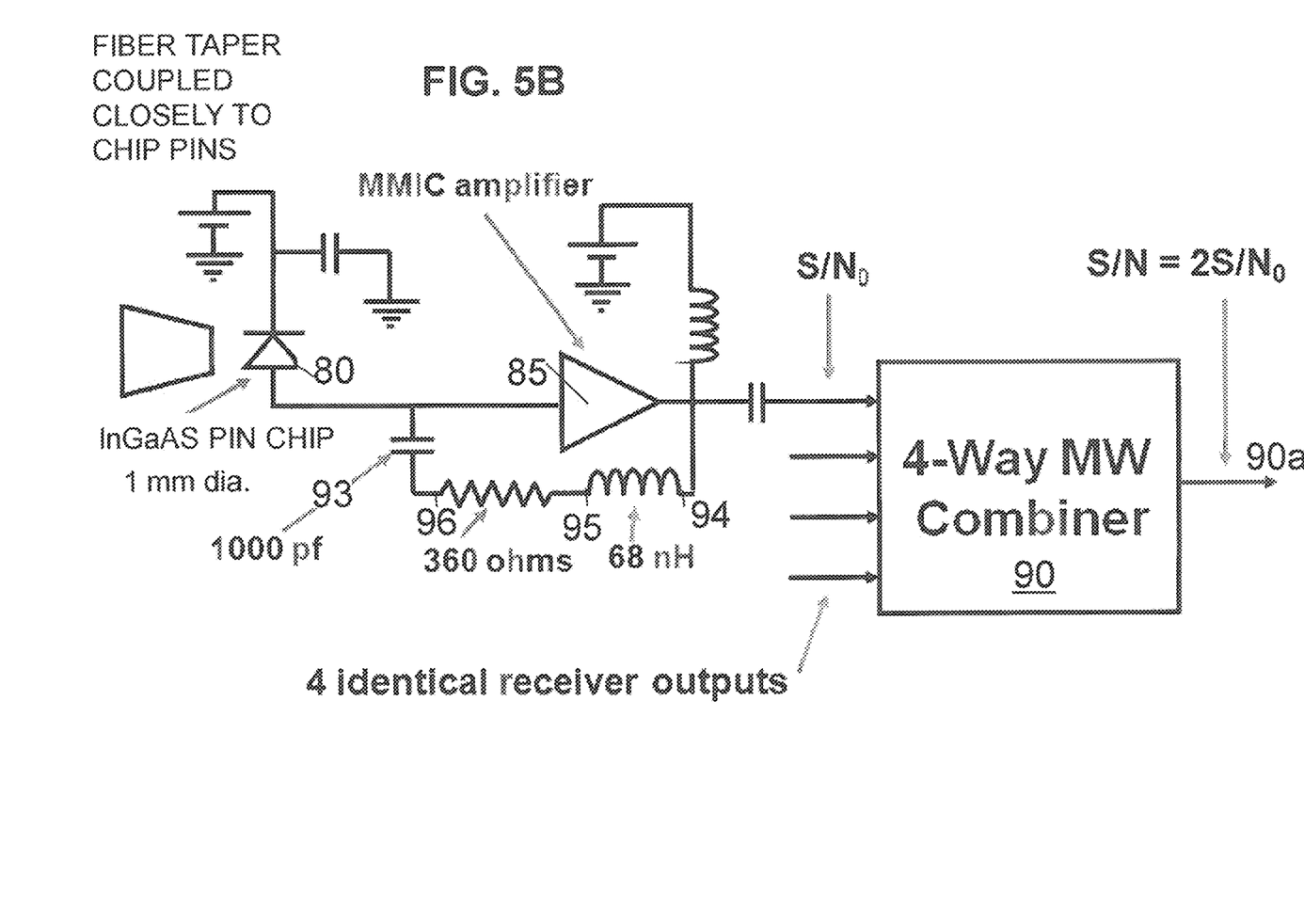
FIG. 5B is a schematic illustration of a single PIN chip detector wherein the output of each PIN chip detector 80 is fed into a separate microwave amplifier 85; and wherein specific examples are given for certain components.

Shown in FIG. 5B is an embodiment comprising specific values for some of the components.

As shown if FIG. 3, amplified signals from each receive element may be combined electrically either using an n-way microwave combiner 90 or an n-way microwave switch 91. The microwave switch 90 is controlled by FPGA 10 in FIG. 4 The receive elements amplified electrical signal may be derived from the output of the microwave amplifier 85 or the output of another combiner 90A.

Although FIG. 3 and FIG. 5A uses a four-way microwave combiner 90 or switch 91, to match the number of PIN chip detectors 40/80 and microwave amplifiers 45/85 combinations (only one of which is shown in FIG. 5A), the embodiments described herein are not limited to a four-way microwave combiner or switch and those skilled in the art could readily increase or decrease the number of inputs to microwave combiner 90 or switch 91 to match increases or decreases in the number of PIN chip detectors 40/80 and microwave amplifiers 45/85 combinations used.

The circuit shown in FIG. 5A also includes feedback circuit 92 positioned as a feedback loop for the output of microwave amplifier 85 to raise the overall bandwidth. In feedback circuit 92, capacitor 93 comprises a large capacitor used to decouple DC signal 94 at amplifier 85 output from the input. Inductor 95 (e.g., a 68 nH inductor) cuts-off the feedback path at high frequencies, where the phase shifts in amplifier 85 may cause conditions for oscillations. In addition, resistor 96 (e.g., a 360Ω resistor) is effectively the actual feedback element over the bandwidth of interest. To further achieve stable (e.g., non-oscillating) performance, amplifier 85 may include a wideband monolithic microwave integrated circuit (MMIC) amplifier (e.g., to provide gain up to 7 GHz).

The invention disclosed herein comprises multiple receive elements composed of optical elements, either classical imaging or non-imaging optics, a small number of detectors, and amplification and summing electronic circuits. Each receive element is composed of a detector or group of detectors coupled to an individual optical element to achieve a higher optical gain than can be achieved with the single receiver used in the previous '301 patent. Multiple receive elements are then mechanically mounted in a way to point each at a specific angle so their combined field of view achieves the required total system field of view as illustrated in FIG. 2 and discussed previously. The collected light is converted to an electrical signal in each receive element and electrically sampled in one of two ways as illustrated in FIG. 3. In the first embodiment of FIG. 3A, the electrical signal from each receive element is electrically combined by electrical combiner 90 to produce a composite signal composed of the signal from the receive element(s) plus the noise from all of the receive elements. In the second embodiment of FIG. 3B, the receive element containing the light signal is electrically switched by the electrical switch 91 in conjunction with the ladar controller to the input of the ladar for sampling. The correct receive element is chosen by the ladar controller because the ladar controller also directs the light beam via the transmitter scan mirror In the second embodiment, the ladar samples an electrical signal which only contains the noise from one receive element which increases the overall system performance.

The preferred embodiment architecture uses a scanned laser beam to illuminate a target downrange and collect the reflected light using the receive elements illustrated in FIG.

2. The architecture consists of circuitry to generate a signal that points the laser beam to a specific location, thus, the systems predetermines which of the multiple detector/lens elements in the multi-aperture receiver design will generate the electrical signal from the return pulse. Therefore, the scan circuitry can then be used to generate a signal to switch the amplified electrical signal from then illuminated lens/detector element into the output electrical path. This approach can be advantageous in certain situations to limit the background signal and noise from the non-illuminated lens/detector elements. FIG. 3 is a simplified block diagram of a preferred embodiment.

Brass Board Ladar Package for MAARS Robot

Figure 7:
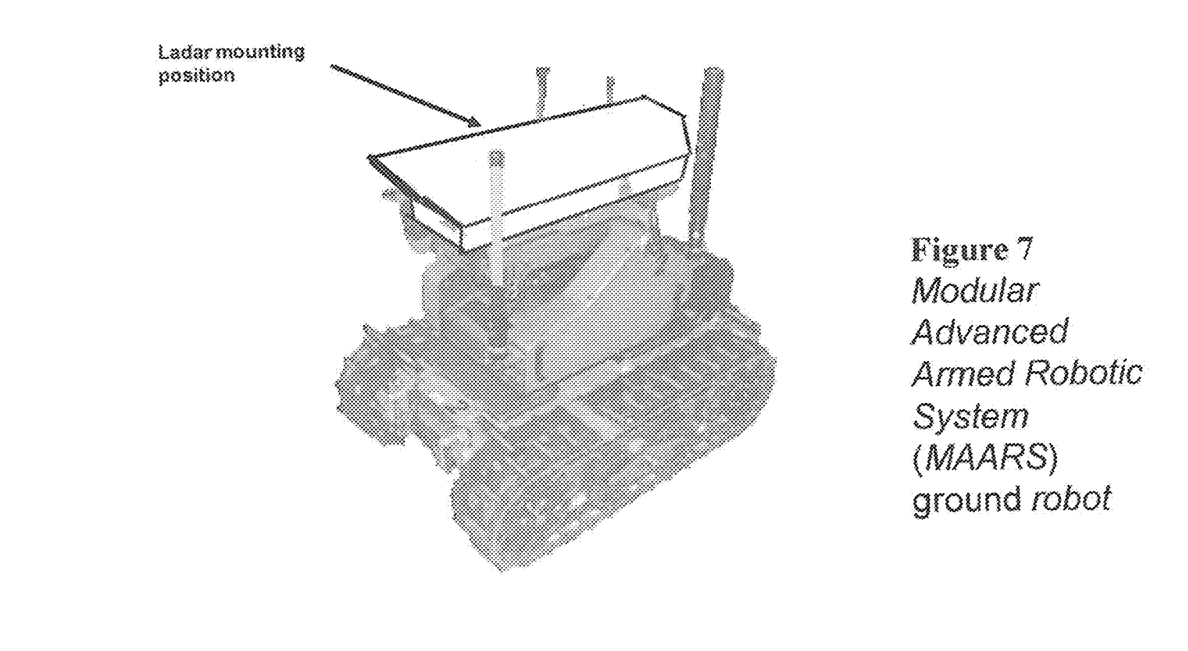
FIG. 7 is a photographic illustration of the MAARS robot which is approximately 1 m long and 1 m high.
Figure 8:
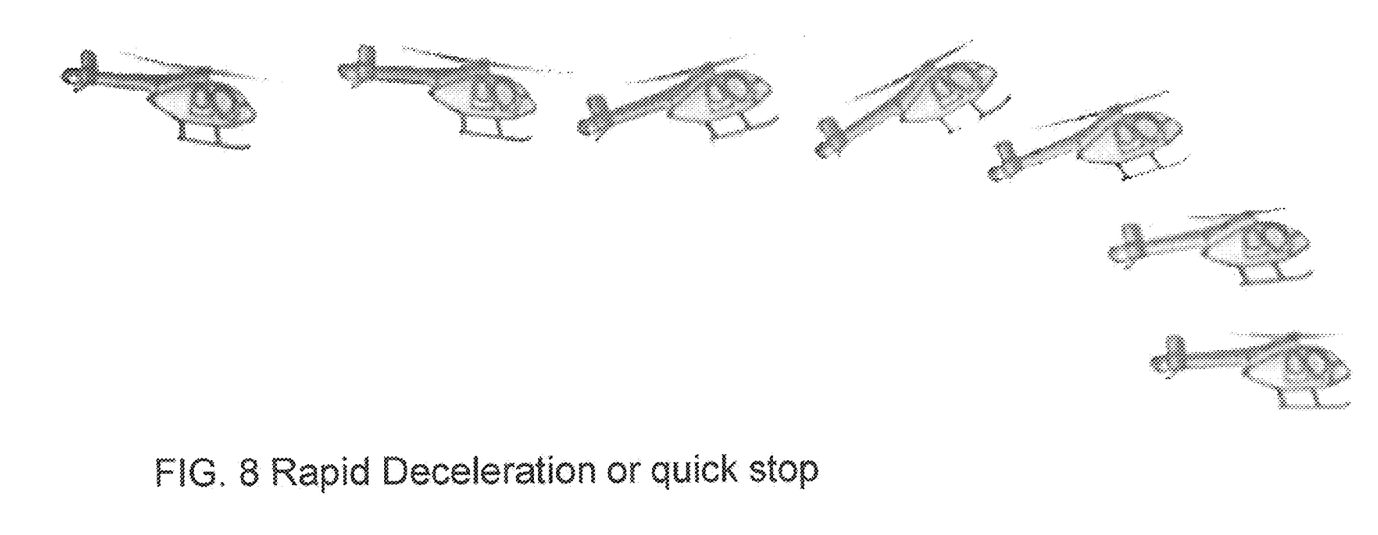
FIG. 8 is a diagrammatic illustration depicting rapid deceleration or quick stop of a rotocraft.

A brass board ladar package built for a MAARS robot used the original '301 hardware and software ARL developed for an earlier PackBot demonstration. FIG. 7 is a photograph of the MAARS robot which is approximately 1 m long and 1 m high. The ladar fits into a COTS camera enclosure which mounts onto the gun rail structure on the turret and is shown in FIG. 7 The turret is capable of pan and tilt independent of the robot body. The ladar is designed to operate for several hours on its own battery source and to interface to a WAVE IP radio network for wireless operation. The ladar may be retro-fitted with improved hardware and software described in Stann, B. L. "Brassboard Development of a MEMS-scanned Ladar Sensor for Small Ground Robots, Proceedings SPIE Laser Radar Technology and Applications XVI (2011) (hereby incorporated by reference).

MAARS Ladar Signal Flow for Data and Controls

Figure 6:
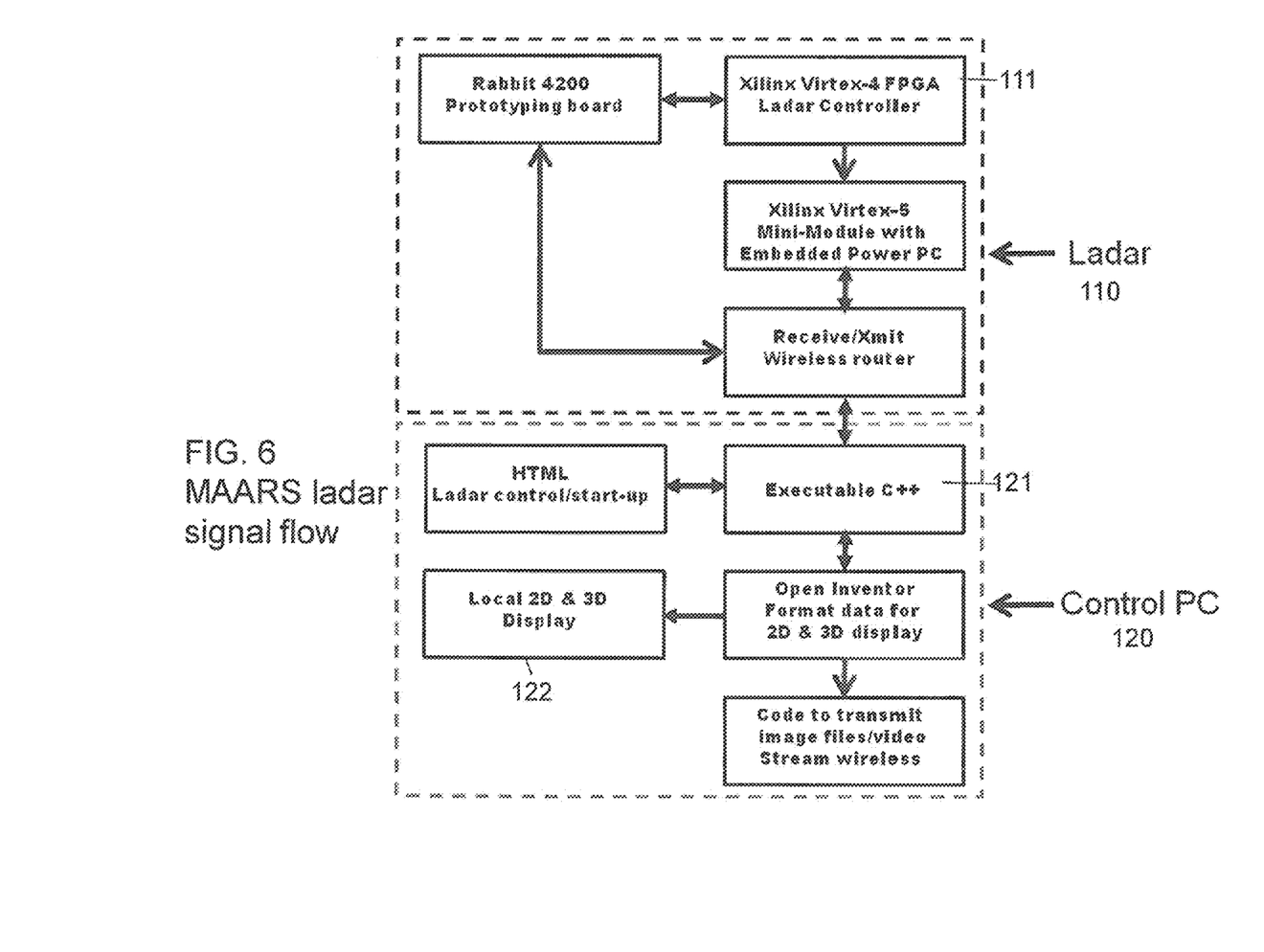
FIG. 6 is a schematic illustration of the ladar signal flow in a preferred embodiment.

FIG. 6 is a block diagram showing the major processes of initializing and starting the ladar, transmitting the data over the Ethernet to the control PC, and displaying the data to users. The ladar control field programmable gate array FPGA 111 accepts digitized data from the ADC, performs range interpolation, and sends the data to the Power-PC FPGA for transmission over the Ethernet. The Power-PC FPGA accepts the raw image data, formats it into 1 k byte packets (UDP protocol), and transmits it to the control PC. A laptop 120 executes C++ code (Box 121) which converts the received UDP data and stores them into sequential files, one file per ladar image frame. Four bytes of data is stored for each pixel (two bytes for the amplitude value and two bytes for the range value) fir a total of 256 azimuth pixels by 128 elevation pixels per frame. Display code written to use the Open Inventor library operates on the files as they are saved and displays the "live" imagery in real time at the full 5 frame per second rate. The display code updates in real-time one window containing a 2-D intensity only image of the live data and a second window containing a 3-D rendering of the live-data point cloud. The 3-D window has controls to manipulate the 3D perspective of the point cloud data presented to the viewer and is not limited to the sensor perspective. The display code also creates a real time 2-D rendering of the displayed 3-D video scene for use in standard (non 3D capable) displays.

The user is able to set up ladar and laser operating parameters, control data acquisition and laser operation, and monitor system status parameters using an HTML interface on the PC, which is connected to a web server application on a Rabbit 4200 microcontroller. This control/status data is transmitted by sharing the Ethernet with the UDP data stream. The Rabbit 4200 web server translates the Ethernet information to communicate with the Virtex-4 via a 4-wire Serial Peripheral Interface (SPI).

One implementation of the above preferred embodiments may be done in conjunction with a rotor craft collision avoidance ladar.

Landing combat rotary aircraft at night in areas confined by obstacles, such as trees, buildings or walls, is extremely challenging. For such missions, pilots rely on pre-flight intelligence to determine the location and size of obstacles in the landing zone in order to plan a safe flight profile. Deviations or missing information in this pre-flight intelligence must be evaluated by the pilot during the landing zone approach in order to avoid a catastrophic collision during landing. At night, this is further complicated by the limited depth perception of night vision devices. Imaging laser radar (ladar) can provide a 3-D image of the landing zone along with object size and distance from the aircraft information as a crucial pilot aid for a rotary aircraft landing in these difficult situations. As described in the foregoing, the ladar may use a commercially available micro-electro-mechanical system (MEMS) mirror to scan a transmitted laser beam over the total system field of view. This technique, coupled with a compact receiver design and low-cost commercial erbium fiber laser, allows for a small, low power, yet highly capable ladar that can fit on a space limited platform. The ladar collects an image size of 256 (h)×128 (v) pixels at a 5 Hz frame rate over a 60°×30° field of view with 40 cm range resolution and approximately 1 centimeter range accuracy. The field of view, range swatch, and laser output power can all be adjusted via software programmable registers and scan files. The system is bi-static and requires a roughly ¾" diameter transmitter window and a 1" diameter receiver window to operate. The ladar transmits at 1.55 μm and is eye-safe when properly interlocked. Detailed technical specifications on the ladar architecture along with the results from a recent field experiment at Camp Roberts can be found in Giza et al, "MEMS-Scanned Ladar Sensor for Small Ground Robots: Brassboard Design and Experimental Results", MSS Active Systems Conference, 2011.

The '301 patent ladar embodiment described above is currently designed to support a 60°×30° field of regard. The desired 45°×60° FOV can be accomplished by using two synchronized 45°×30° FOV ladars mounted on the rotorcraft with slightly overlapping FOV. The 45°×30° FOV can be achieved by a simple reprogramming of FPGA control 10 in FIG. 4.

One preferred embodiment is to divide the total system FOV into (6) segments with each segment covered by a separate receive element with approximately 150 FOV. Each of the (6) receive elements use a 2-mm detector optically coupled to a 10 mm aspheric lens. The (6) receive elements are then arrayed and pointed with overlapping FOV to roughly cover the required total 45°×30° system FOV. Laboratory measurements verified a receive element using a 10 mm aspheric lens had approximately four times the signal to noise or twice the range performance of the '301 WFOV non-imaging receiver when illuminating the same target.

The term "processor" as used herein means one or more processing units, central processing units, processor cores, microprocessors, digital signal processors, multiprocessors, computers, supercomputers, data processor, laptops, signal processors, personal computers, and/or any component which processes data, and/or controllers, which may be connected together or to other circuitry in a manner known to those of ordinary skill in the art.

The term "image generator" as used herein includes a processor which generate images and/or any element or component, including components within a processor, which generate images. The term "comparator" as used herein means a component within a processor operative to complete a comparison function or a separate processor or component which compares sets of data in order to determine lesser or equal values.

The term "bitmap" is derived from a mapped array of bits, and bitmapped and pixmap refer to the similar concept of a spatially mapped array of pixels. The term "bitmapped" as used herein encompasses pixmap. The term "bitmapped" means a set of bits that represents a graphic image, with each bit or group of bits corresponding to a pixel. As used in the following claims, the term "bitmapped" encompasses all images formed using pixels. For example, all images acquired by digital cameras and camcorders, scanners, and screen capture programs are bitmapped images.

As used in the foregoing claims, the terminology "area" includes object(s), person(s), setting, place, or scene. For example, "scanning an area" includes scanning an object or objects, person or persons, place or scene. The terminology positional data includes but is not limited to spatial information relating to location.

As used herein and in the following claims, the terminology "data point" "data point" represents the received signal radar data from each position obtained during an instant or interval in time combined with positional information. The positioning information may, for example, correspond to the transmitting and/or receiving position or location. The data points may be collected by either an array of elements or a single moving element which receives data at points in time, or the combination of both; e.g., a physical array of elements with the elements moving over increments of time. The data collection may be sporadic or at specific intervals of time. The data points are arranged to form an aperture.

It should be emphasized that the above-described embodiments are merely possible examples of implementations. Many variations and modifications may be made to the above-described embodiments. All such modifications and variations are intended to be included herein within the scope of the disclosure and protected by the following claims.

The invention claimed is:

1. A system comprising:
a laser configured to transmit a beam of light towards a target area;
a controller configured to control output of the laser;
a receiver configured to collect reflected pulses of light reflected from the target area, the receiver comprising a plurality of receive elements, each of the receive elements having a different field of view of the target area;
a combiner configured to combine outputs of the plurality of receive elements into one composite signal of the target area;
an interface circuitry configured to convert the composite signal into a 3-D image of the field of view of the target area; and
a display unit configured to display output from interface circuitry.

2. The system of claim 1, further comprising scan circuitry configured to generate a signal that points a laser beam to a specific location and predetermine which of the plurality of receive elements will generate the electrical signal from a return pulse: the scan circuitry being used to generate a signal to switch the amplified electrical signal from then illuminated receiver element into the output electrical path so as to limit background signal and noise from the non-illuminated receiving elements; and wherein the receive elements comprise a plurality of lenses and a plurality of sensors coupled to said plurality of lenses, and wherein each sensor comprises a photosensitive region and outputs a photocurrent;
a plurality of microwave amplifiers, wherein each amplifier is coupled to one of a plurality of sensors and amplifies said photocurrent;
a plurality of feedback circuits, wherein each feedback circuit is coupled to an input and output of a microwave amplifier and raises the bandwidth of a circuit comprising said sensor and said microwave amplifier; and
wherein the combiner is a microwave combiner that combines the photocurrent from each of said plurality of microwave amplifiers to a combined output; and wherein the displayed output is utilized to determine the range of the target.

3. The system of claim 2 wherein the plurality of receive elements are operatively connected to a fiber optic bundle and the plurality of sensors comprise an array of detectors and amplification and summing electronic circuits, and wherein the fiber optic bundle magnifies a light collection area of an array of detectors and collects light monotonically over a 60° FOV, and wherein each detector in the array then converts the light into an electrical signal which is amplified and electrically summed to produce a single output voltage.

4. The system of claim 1 wherein the receive elements comprise optical elements, a plurality of detectors, and amplification and summing electronic circuits; each receive element comprises one of a detector or group of detectors coupled to an individual optical element; and wherein the system further comprises scan circuitry configured to generate a signal that points a laser beam to a specific location, and wherein the receive element is chosen by the controller based upon the direction of the light beam via the controller of a transmitter scan mirror; and wherein the system comprises circuitry to generate a signal that points the laser beam to a specific location such that the system predetermines which of the plurality of detectors will generate an electrical signal from the return pulse and the scan circuitry operates to generate a signal to switch the amplified electrical signal from then illuminated detector so as to be selectively outputted; whereby background signal and noise from the non-illuminated lens/detector elements is reduced and wherein the collected light is converted to an electrical signal in each receive element and the electrical signal from each receive element is electrically combined by a combiner to produce a composite signal comprising the signal from the receive element; and wherein the combiner produces a summation of outputs of the receive elements.

5. The system of claim 1, wherein the controller comprises a MEMS mirror and wherein the plurality of receive elements comprise a lens and an InGaAs PIN photo detector.

6. The system of claim 1, further comprising an analog-to-digital converter coupled to the interface circuitry and at least one processor and a field programmable gate array, wherein input from the interface circuitry is sampled to produce sampling data; and wherein the sampling data is fed to a field programmable gate array which stores the sampling data as a function of time in an associated memory and wherein the field programmable gate array determines the range to a pixel and formats the data for display; and wherein the displayed output is utilized to determine the range of the target.

7. The system of claim 6, further comprising an analog-to-digital converter coupled to the interface circuitry and at least one processor and wherein the at least one processor comprises a field programmable gate array for processing sampling data from the analog-to-digital converter and wherein the at least one processor operates to control the laser in generating said pulses of light.

8. The system of claim 6, wherein the at least one processor comprises a first-in-first-out memory storing sampling data from the analog-to-digital converter.

9. The system of claim 1, wherein said transmitter comprises a movable microelectromechanical system mirror to direct pulses of light.

10. The system of claim 9, wherein the at least one processor controls the microelectromechanical system mirror.

11. The system of claim 9, further comprising a telescope coupled to the microelectromechanical system mirror, wherein said pulses of light generated from said laser are reflected from the microelectromechanical system mirror is amplified by said telescope and further comprising a high voltage amplifier producing analog voltages that controls a pointing direction of the microelectromechanical system mirror and wherein a digital-to-analog converter is coupled to the high voltage amplifier and at least one processor is coupled to the digital to analog converter, and wherein the at least one processor generates a digital signal to control the pointing direction of microelectromechanical system mirror.

12. An apparatus for receiving pulses of light from a Laser Detection and Ranging (LADAR) transmitter comprising:
   a plurality of lenses;
   a plurality of sensors coupled to said plurality of lenses, wherein each sensor comprises a photosensitive region and outputs a photocurrent;
   a plurality of microwave amplifiers, wherein each amplifier is coupled to a sensor and amplifies said photocurrent;
   a plurality of feedback circuits, wherein each feedback circuit is coupled to an input and output of a microwave amplifier and raises the bandwidth of a circuit comprising said sensor and said microwave amplifier, and
   a microwave combiner combining said photocurrent from each of said plurality of microwave amplifiers to a combined output.

13. The apparatus of claim 12, wherein the microwave amplifier comprises a wideband monolithic microwave integrated circuit amplifier.

14. The apparatus of claim 12, wherein each of said plurality of sensors comprises an InGaAs PIN photo detector.

15. A ladar system comprising:
   a pulse laser configured to generate pulses of light;
   a transmitter configured to transmit pulses of light toward a target;
   a receiver configured to collect light reflected from said target, the receiver comprising:
   a plurality of receive elements, each receive element comprising a lens and a sensor coupled to the lens, each sensor comprising:
   a photosensitive region and outputting a photocurrent;
   an amplifier configured to amplify the photocurrent, and
   an electrical switch operating to select a predetermined receive element containing the amplified photocurrent;
   a power divider configured to split the amplified photocurrent between a high gain channel and a low gain channel;
   a radio frequency (RF) interface operatively connected to the high gain and low gain channels,
   at least one processor operatively connected to the RF interface; and
   a display unit configured to display output from the at least one processor correlating to an image of the field of view of the target area.

16. The system of claim 15 further comprising:
   a plurality of microwave amplifiers configured to amplify the photocurrent, wherein each amplifier is coupled to a sensor;
   a plurality of feedback circuits, wherein each feedback circuit is coupled to an input and output of a microwave amplifier and raises the bandwidth of a circuit comprising the sensor and said microwave amplifier.

17. The system of claim 15 wherein the system comprises a rotorcraft advanced surveillance and collision avoidance system used for landing rotary aircraft in darkness in areas containing obstacles.

18. The system of claim 17 wherein the plurality of receive elements are operatively connected to a fiber optic bundle and the sensor comprises an array of detectors and amplification and summing electronic circuits, and wherein the fiber optic bundle magnifies a light collection area of the detector array and collects light monotonically over an approximately 60° C. FOV, and wherein each detector in the array then converts the light into an electrical signal which is amplified and electrically summed to produce a single output voltage.

19. The system of claim 15 wherein a 3-D image of a landing zone and an obstacle size is provided on the display unit.

20. The system of claim 15 wherein the plurality of receive elements are operatively connected to a fiber optic bundle and the sensor comprises an array of detectors and amplification and summing electronic circuits, and wherein the fiber optic bundle magnifies a light collection area of the detector array and collects light monotonically over a 60° FOV, and wherein each detector in the array then converts the light into an electrical signal which is amplified and electrically summed to produce a single output voltage.

* * * * *